(12) United States Patent
Nohira (10) Patent No.: US 6,234,199 B1
(45) Date of Patent: May 22, 2001

(54) HYDRAULIC PRESSURE CONTROL UNIT

(75) Inventor: Shigemitsu Nohira, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/457,870

(22) Filed: Dec. 10, 1999

(30) Foreign Application Priority Data

Dec. 12, 1998 (JP) .................................................. 10-375133

(51) Int. Cl.[7] .............................. F16K 37/00; B60T 8/36
(52) U.S. Cl. ...................... 137/557; 137/884; 303/119.3
(58) Field of Search .................................. 137/557, 884; 303/119.2, 119.3, DIG. 3, DIG. 12

(56) References Cited

U.S. PATENT DOCUMENTS

| | | | |
|---|---|---|---|
| 4,932,728 | * 6/1990 | Schenk et al. | 303/119.2 |
| 5,474,108 | 12/1995 | Inden et al. | 137/884 |
| 5,482,362 | * 1/1996 | Robinson | 303/119.2 |
| 5,820,228 | * 10/1998 | Schneider et al. | 303/119.3 |
| 5,937,898 | * 8/1999 | Gluf, Jr. et al. | 137/560 |
| 6,007,162 | * 12/1999 | Hinz et al. | 303/119.3 |
| 6,086,041 | * 7/2000 | Gattuso et al. | 251/129.06 |

FOREIGN PATENT DOCUMENTS

| | | |
|---|---|---|
| 7-248068 | 9/1995 | (JP) . |
| 8-80827 | 3/1998 | (JP) . |

* cited by examiner

Primary Examiner—John Rivell
(74) Attorney, Agent, or Firm—Burns, Doane, Swecker & Mathis, LLP (57) ABSTRACT

The present invention is directed to a hydraulic pressure control unit, which includes a housing having hydraulic passages defined therein, and a plurality of electromagnetic valves having valve mechanisms disposed in the hydraulic passages and solenoid coil portions mounted on one wall of the housing for actuating the valve mechanisms. The electromagnetic valves include four large electromagnetic valves provided with cylindrical solenoid coil portions, each having a relatively large diameter, and eight small electromagnetic valves provided with cylindrical solenoid coil portions, each having a relatively small diameter. And, two rows of four small electromagnetic valves aligned in a row are located in parallel with each other on the wall of the housing, and two rows of two large electromagnetic valves aligned in a row are located in parallel with the two rows of the four small electromagnetic valves. Each of the four large electromagnetic valves is located in substantial contact with two neighboring small electromagnetic valves in each row of the four small electromagnetic valves.

10 Claims, 6 Drawing Sheets

HYDRAULIC PRESSURE CONTROL UNIT

This application claims priority under 35 U.S.C. Sec. 119 to No.10-375133 filed in Japan on Dec. 12, 1998, the entire content of which is herein incorporated by reference.

BACKGROUND OF THE INVENTION

1. Field of the Invention

The present invention relates generally to a hydraulic pressure control unit, and more particularly to the hydraulic pressure control unit which is applicable to a hydraulic pressure control system of an automobile for performing a steering control by braking and the like.

2. Description of the Related Arts

In a conventional hydraulic pressure control system of an automobile, electromagnetic valves have been employed for controlling the hydraulic pressure. As an embodiment, employed is a hydraulic pressure control unit having a housing with hydraulic passages defined therein, and a plurality of electromagnetic valves communicated with the hydraulic passages. One such hydraulic pressure control unit is disclosed in Japanese Patent Laid-open Publication No.7-248068, which corresponds to U.S. Pat. No. 5,474,108. In that unit, valve mechanisms of electromagnetic valves are accommodated in a housing, and solenoid coil portions are mounted on one wall of the housing, in parallel with each other.

Figure 7:
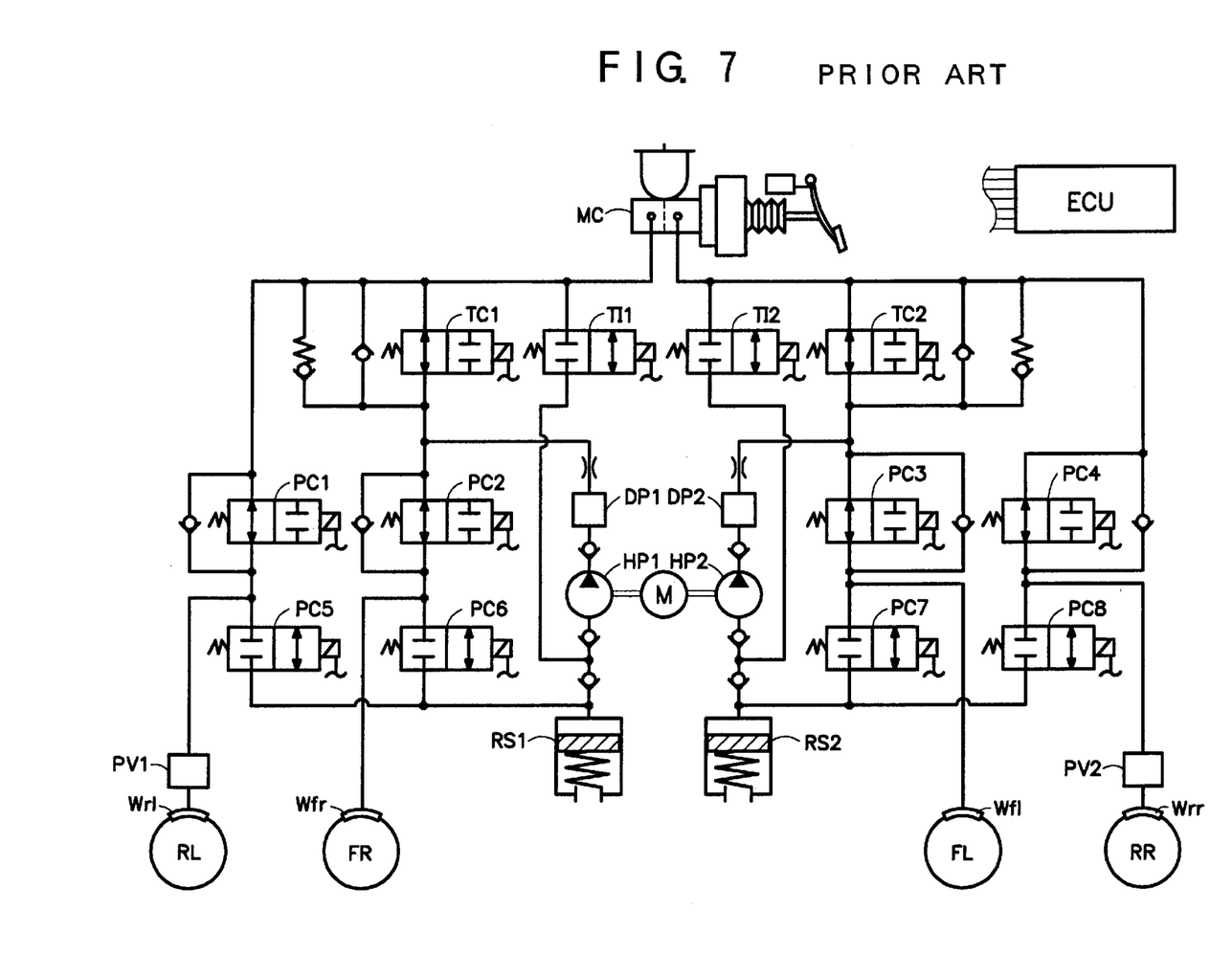
FIG. 7 is a schematic block diagram of a prior hydraulic braking pressure control system used for a traction control system.

Such hydraulic pressure control unit is used for various hydraulic pressure control systems, including a conventional system with a traction control system as shown in FIG. 7, for example. FIG. 7 illustrates a front-rear hydraulic braking system for use in a front drive vehicle with front wheels FR, FL driven. Wheel brake cylinders Wfr, Wfl, Wrr, Wrl are operatively mounted on the wheels including rear wheels RR, RL, respectively. Between these wheel brake cylinders and a master cylinder MC are disposed electromagnetic valves PC1–PC8 for controlling the hydraulic pressure, and electromagnetic valves TC1, TC2, TI1, TI2 for changing control modes. In FIG. 7, DP1, DP2 designate dampers, PV1, PV2 designate proportioning valves, RS1, RS2 designate reservoirs, and ECU designates an electronic controller.

Figure 8:
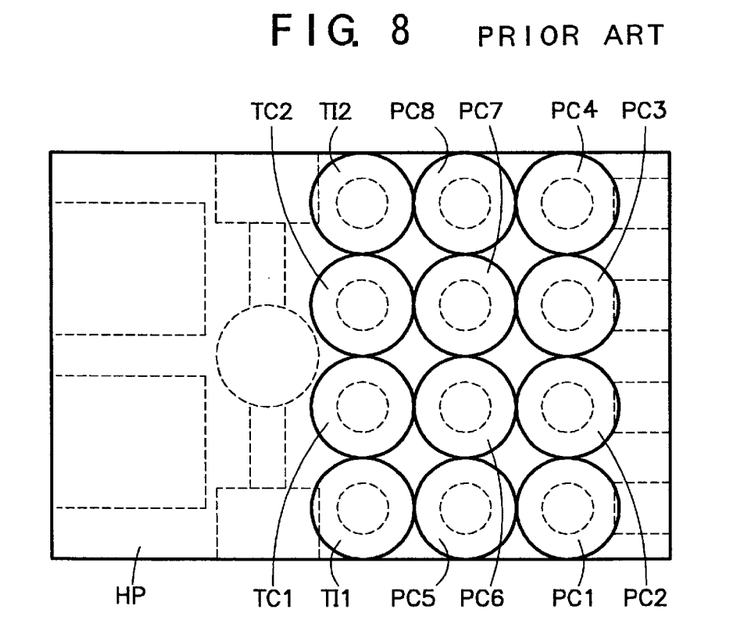
FIG. 8 is a plan view of a hydraulic pressure control unit with a case thereof removed, for use in the prior system as shown in FIG. 7.

In the above hydraulic pressure control system, is used a hydraulic pressure control unit similar to the one as disclosed in the Publication No. 7-248068, while each solenoid coil portion is formed in a cylindrical configuration, without being received in a rectangular case as shown in that Publication. For instance, twelve electromagnetic valves in total are mounted on the housing HP to form the hydraulic pressure control unit, as shown in FIG. 8. More precisely, the valve mechanism of each electromagnetic valve is accommodated in the housing HP, while its cylindrical solenoid coil portion is mounted on one wall of the housing HP to extend therefrom. In this case, provided that the outer diameters of all of the solenoid coil portions are equal, the twelve valves can be located with the neighboring valves being in contact with each other, as shown in FIG. 8.

In such a hydraulic pressure control system that performs a steering control by braking operation (i.e., an excessive oversteer restraining control and an excessive understeer restraining control), however, it is necessary to control the brake fluid pressurized at a relatively high pressure, with a brake pedal depressed. Therefore, in lieu of the electromagnetic valves TC1, TC2, TI1, TI2 for the traction control system as shown in FIG. 8, are employed such electromagnetic valves SC1, SC2, SI1, SI2 having solenoid coil portions of relatively large outer diameters as shown in FIG. 9.

Figure 9:
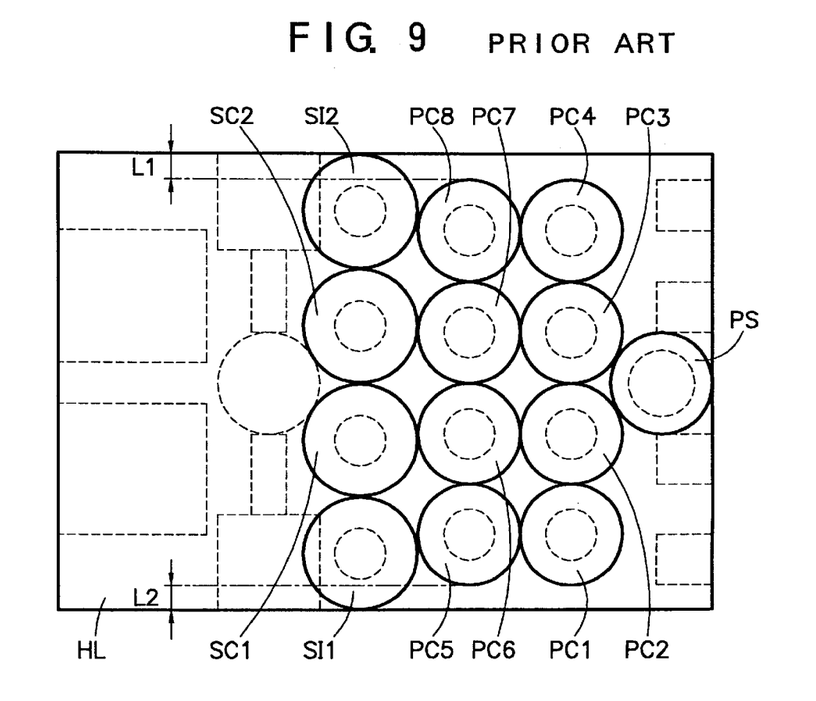

Supposing that the electromagnetic valves SC1, SC2, SI1, SI2 as shown in FIG. 9 are substituted for the electromagnetic valves TC1, TC2, TI1, TI2 as shown in FIG. 8, the housing HL in FIG. 9 is to be made larger than the housing HP in FIG. 8, which will result in increase in size of the hydraulic pressure control unit as a whole. That is, comparing with the housing HR as shown in FIG. 8, the housing HL is to be enlarged in the horizontal direction in FIG. 9, by a difference between the outer diameter of the valve SC1 or the like and that of the valve TC1 or the like, and in the vertical direction in FIG. 9, by a total of the difference between the outer diameter of the valve SC1 and the like, and that of the valve TC1 and the like (i.e., L1+L2 in total as shown in FIG. 9).

In the case where the pressure sensor PS is to be provided for detecting a condition for use in the steering control by braking system or the like, the unit will be necessarily enlarged further in the horizontal direction in FIG. 9.

SUMMARY OF THE INVENTION

Accordingly, it is an object of the present invention to provide a hydraulic pressure control unit, which is provided with a plurality of electromagnetic valves having solenoid coil portions of different sizes, and which can be made small in size as a whole, by locating the electromagnetic valves appropriately.

In accomplish the above and other objects, a hydraulic pressure control unit includes a housing having hydraulic passages defined therein, and a plurality of electromagnetic valves having valve mechanisms disposed in the hydraulic passages and solenoid coil portions mounted on one wall of the housing for actuating the valve mechanisms. The electromagnetic valves include four large electromagnetic valves provided with cylindrical solenoid coil portions, each having a relatively large diameter, and eight small electromagnetic valves provided with cylindrical solenoid coil portions, each having a relatively small diameter. And, two rows of four small electromagnetic valves aligned in a row are located in parallel with each other on the wall of the housing, and two rows of two large electromagnetic valves aligned in a row are located in parallel with the two rows of the four small electromagnetic valves.

The hydraulic pressure control unit may further include a hydraulic pressure sensor which is provided for detecting the hydraulic pressure in the hydraulic passages defined in the housing, and which is located between the two large electromagnetic valves aligned in a row.

Preferably, each of the four large electromagnetic valves is located in substantial contact with two neighboring small electromagnetic valves in each row of the four small electromagnetic valves.

BRIEF DESCRIPTION OF THE DRAWINGS

The above stated object and following description will become readily apparent with reference to the accompanying drawings, wherein like reference numerals denote like elements, and in which:

FIG. 9 is a plan view of a hydraulic pressure control unit with a case thereof removed, having relatively large valves for use in a prior hydraulic braking pressure control system for a steering control by braking system or the like.

DESCRIPTION OF THE PREFERRED EMBODIMENTS

Figure 1:
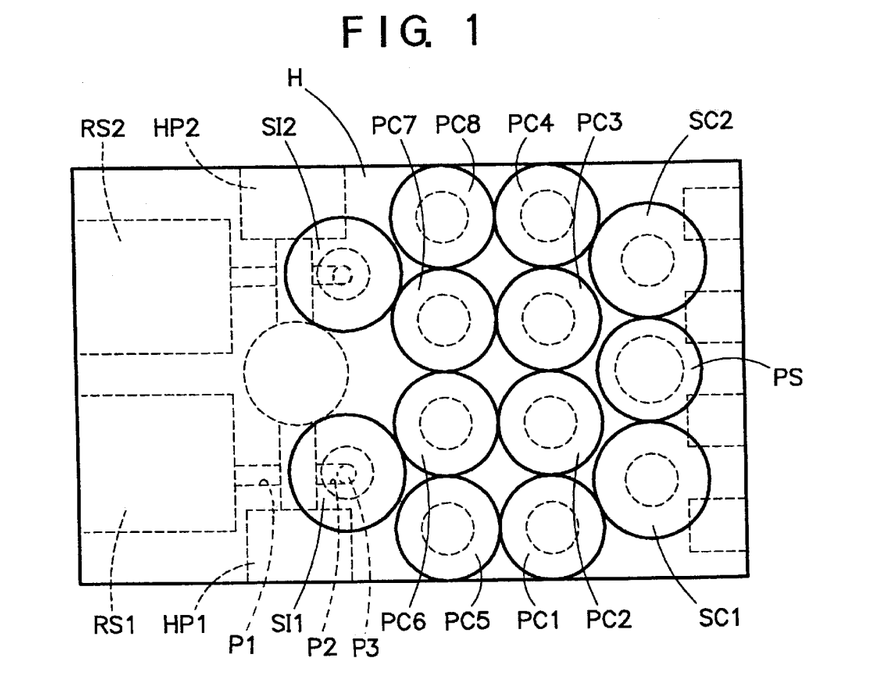
FIG. 1 is a plan view of a hydraulic pressure control unit with a case thereof removed, according to a first embodiment of the present invention.
Figure 2:
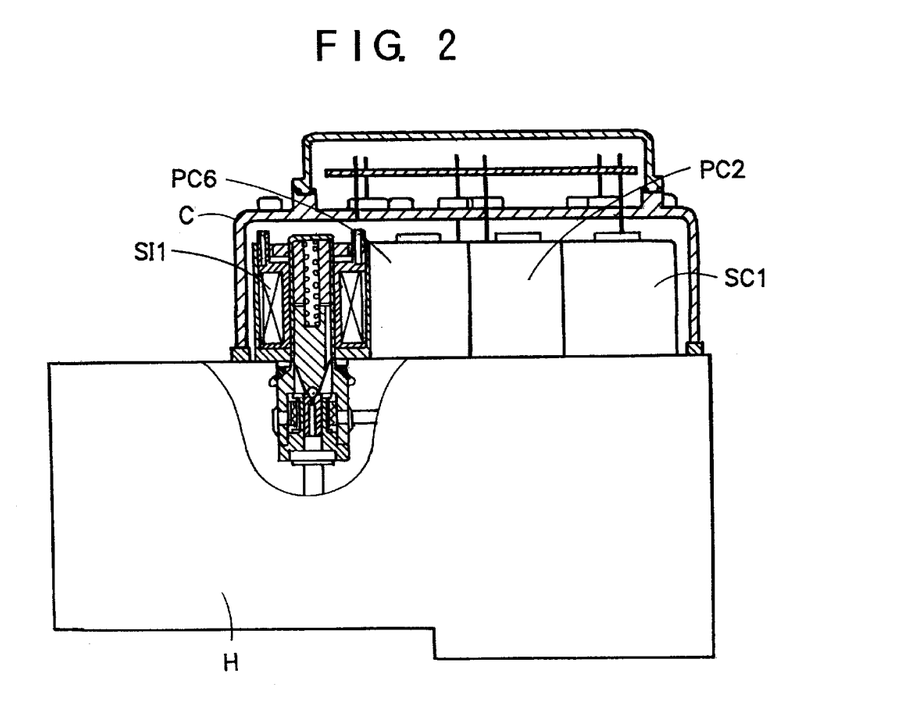
FIG. 2 is a front view sectioned in part of the hydraulic pressure control unit according to the first embodiment of the present invention.
Figure 3:
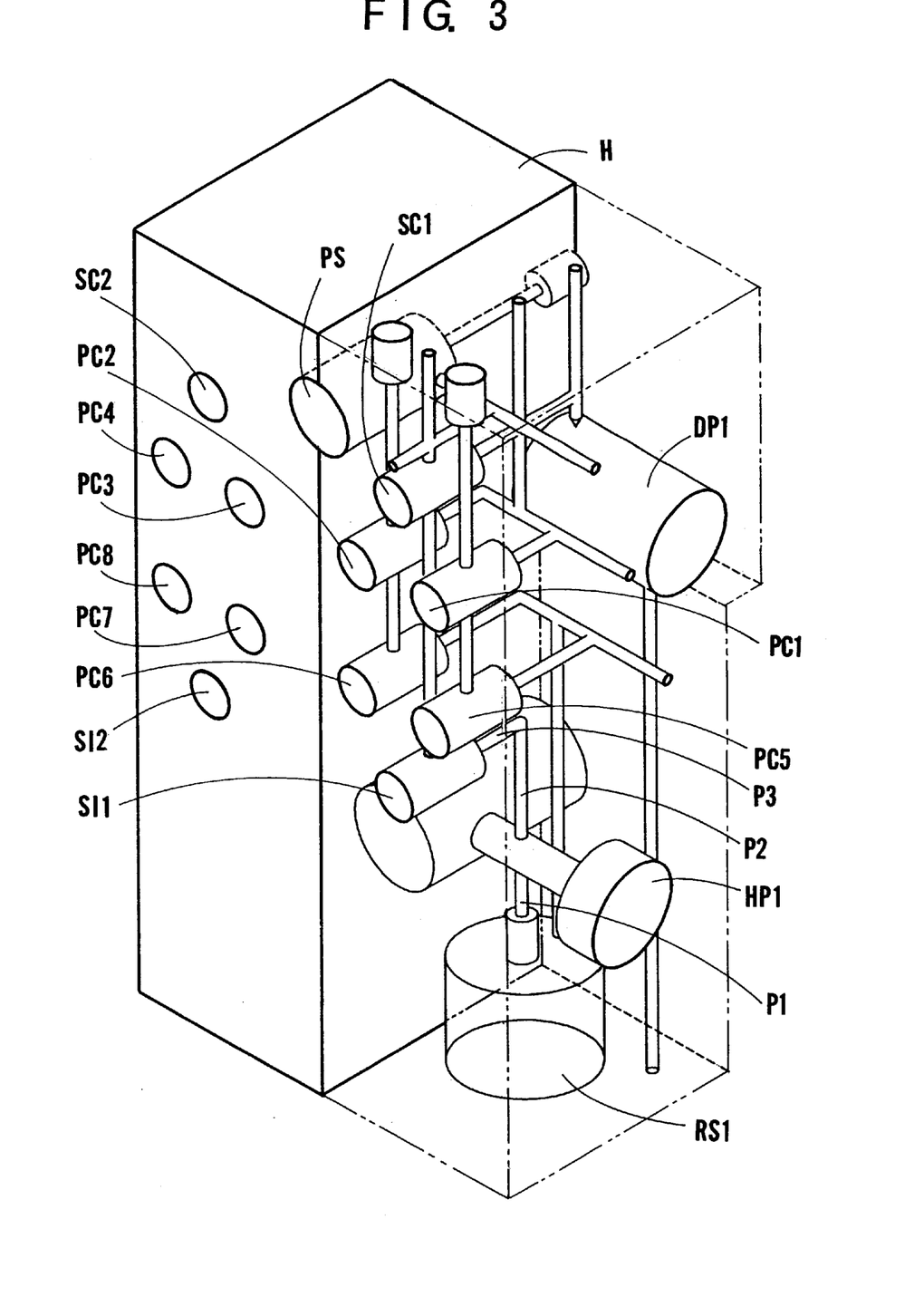
FIG. 3 is a perspective view of the hydraulic pressure control unit, showing hollow space within its housing according to the first embodiment of the present invention.
Figure 4:
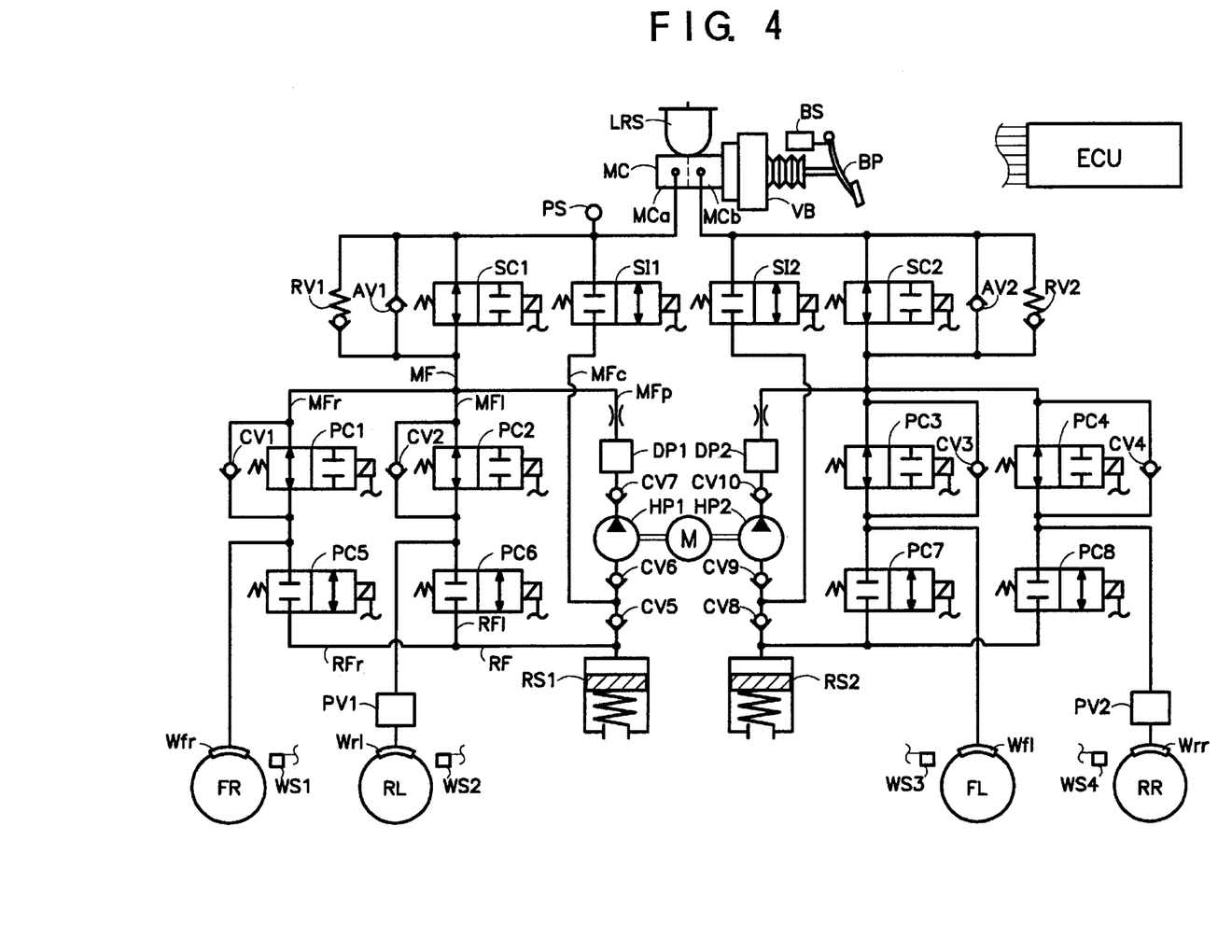
FIG. 4 is a schematic block diagram of a hydraulic braking pressure control system including the hydraulic pressure control unit according to the first embodiment of the present invention.

Referring to FIGS. 1–3, there is illustrated a hydraulic pressure control unit according to an embodiment of the present invention, for use in a hydraulic braking pressure control system for an automotive vehicle as shown in FIG. 4. In the hydraulic braking pressure control system as shown in FIG. 4, wheel brake cylinders Wfr, Wfl, Wrr, Wrl are operatively mounted on front wheels FR, FL and rear wheels RR, RL of the vehicle, respectively. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a so-called diagonal hydraulic circuit system is employed, though a front-rear hydraulic circuit system may be employed.

In the hydraulic braking pressure control system, a master cylinder MC is activated through a vacuum booster VB in response to depression of a brake pedal BP to pressurize the brake fluid in a low-pressure reservoir LRS and output a master cylinder pressure to hydraulic circuits for the wheels FR, RL and the wheels FL, RR, respectively.

The master cylinder is of a tandem type having two pressure chambers communicated with two hydraulic circuits, respectively. That is a first pressure chamber MCa is communicated with the hydraulic circuit for the wheels FR, FL, and a second pressure chamber MCb is communicated with the hydraulic circuit for the wheels FL, RR.

In the hydraulic circuit for the wheels FR, RL, the first pressure chamber MCa is communicated with wheel brake cylinders Wfr, Wrl respectively, through a main passage MF and its branch passages MFr, MFl. A normally open two-port two-position electromagnetic switching valve SC1 (hereinafter, simply referred to as the electromagnetic valve SCl) is disposed in the main passage MF, to act as a so-called cut-off valve. Also, the first pressure chamber MCa is communicated through an auxiliary passage MFc with check valves CV5, CV6, which will be described later. A normally closed two-port two-position electromagnetic switching valve SI1 (hereinafter, simply referred to as the electromagnetic valve SI1) is disposed in the auxiliary passage MFc. In the main passage MF, a pressure sensor PS is connected to detect the master cylinder pressure, which is output to an electronic controller ECU, as a signal varied in response to depression of the brake pedal BP.

And, normally open two-port two-position electromagnetic switching valves PC1, PC2 (hereinafter, simply referred to as electromagnetic valves PC1, PC2) are disposed in the branch passages MFr, MFl, respectively, and in parallel therewith check valves CV1, CV2 are disposed, respectively. The check valve CV1, CV2 are provided for allowing the flow of the brake fluid toward the master cylinder MC and preventing the flow toward the wheel brake cylinders Wfr, Wrl. The brake fluid in the wheel brake cylinders Wfr, Wrl is returned to the master cylinder MC, and then to the low-pressure reservoir LRS through the check valves CV1, CV2 and the electromagnetic valve SC1 placed in its open position as shown in FIG. 1. Accordingly, if the brake pedal BP is released, the hydraulic pressure in the wheel brake cylinders Wfr, Wrl is rapidly reduced to the pressure lower than the pressure at the master cylinder MC. And, normally closed two-port two-position electromagnetic switching valves PC5, PC6 (hereinafter, simply referred to as electromagnetic valves PC5, PC6) are disposed in the branch passages RFr, RF1, respectively, which merge into a drain passage RF connected to the reservoir RS1.

In the hydraulic circuit for the wheels FR, RL, the electromagnetic valves PC1, PC2, and electromagnetic valves PC5, PC6 form modulators for controlling the hydraulic pressure, respectively. A hydraulic pressure pump HP1 is disposed in a passage MFp connected to the branch passages MFr, MFl at the upstream of the electromagnetic valves PC1, PC2, and an outlet of the pressure pump HP1 is connected to the electromagnetic valves PC1, PC2 through a check valve CV7 and a damper 11 for reducing a pressure vibration. The pressure pump HP1 and a pressure pump HP2 in the other hydraulic circuit are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and spring to act as an accumulator for storing a necessary volume of the brake fluid for various controls.

The check valve CV5 is provided for preventing the flow of the brake fluid toward the reservoir RS1 and allowing the reverse flow. The check valves CV6, CV7 are provided for restricting the flow of the brake fluid discharged from the pressure pump HP1 in a predetermined direction, and normally formed within the pressure pump HP1 in a body. The electromagnetic valve SI1 is normally placed in the closed position as shown in FIG. 4 where the communication between the master cylinder MC and the inlet of the pressure pump HP1 is blocked, and switched to the open position where the master cylinder MC is communicated with the inlet of the pressure pump HP1.

In parallel with the electromagnetic valve SC1, is disposed a relief valve RV1 which prevents the brake fluid in the master cylinder MC from flowing toward the electromagnetic valves PC1, PC2, and allows the brake fluid to flow toward the master cylinder MC when the hydraulic pressure at the electromagnetic valves PC1, PC2 is greater than the hydraulic pressure at the master cylinder MC by a predetermined pressure difference, and a check valve AV1 which allows the flow of the brake fluid toward the wheel brake cylinders Wfr, Wrl, and prevents its reverse flow. The relief valve RV1 is provided for returning the brake fluid to the low-pressure reservoir LRS through the master cylinder MC when the pressurized brake fluid discharged from the pressure pump HP1 is greater in pressure than the brake fluid discharged from the master cylinder MC by the predetermined pressure difference. Therefore, when the pressure pump is driven, the hydraulic pressure in the main passage MF is modulated to be increased by a predetermined pressure (e.g., 120 atm) by means of the relief valve RV1. Furthermore, by means of the check valve AV1, even if the electromagnetic valve SC1 is in its closed position, when the brake pedal BP is depressed, the hydraulic pressure in the wheel brake cylinders Wfr, Wrl is increased. The damper DP1 is disposed at the outlet side of the pressure pump HP1. And, a proportioning valve PV1 is disposed in a passage connected to the rear wheel brake cylinder Wrl.

In the hydraulic circuit for the wheels FL, RR, are disposed a reservoir RS2, damper DP2, proportioning valve PV2, normally open two-port two-position electromagnetic switching valve SC2, normally closed two-port two-position electromagnetic switching valves SI2, PC7, PC8, normally open two-port two-position electromagnetic switching valves PC3, PC4, check valves CV3, CV4, CV8–CV10, relief valve RV2, and check valve AV2. The pressure pump HP2 is driven by the electric motor M together with the pressure pump HP1, both of the pumps HP1 and HP2 will be driven continuously after the motor M starts to operate them. The electromagnetic valves SC1, SC2, SI1, SI2 and PC1–PC8 are controlled by the electronic controller ECU to perform the control modes such as the steering control by braking mode.

According to the hydraulic braking pressure control system, the control modes including the anti-skid control, traction control, steering control by braking and the like are executed by the electronic controller ECU. In a normal braking operation, all the valves are placed in their normal positions and the motor M is stopped as shown in FIG. 4. When the brake pedal BP is depressed in the conditions as shown in FIG. 4, the master cylinder MC is actuated to discharge the master cylinder pressure from the first and second pressure chambers MCa, MCb to the hydraulic circuit for the wheels FR, RL, and the hydraulic circuit for the wheels FL, RR, respectively, and supply the pressure into the wheel brake cylinders Wfr, Wrl, Wfl, Wrr, through the electromagnetic valves SC1, SC2 and the electromagnetic valves PC1–PC8. Since the hydraulic circuits for the wheels FR, RL and wheels FL, RR are substantially the same, only the hydraulic circuit for the wheels FR, RL will be explained hereinafter.

During the braking operation, when the wheel FR tends to be locked for example, and the anti-skid control is initiated, the electromagnetic valve PC1 is placed in its closed position, and the electromagnetic valve PC5 is placed in its open position, while the electromagnetic valve SC1 is placed in its open position. As a result, the brake fluid in the wheel brake cylinder Wfr is drained into the reservoir RS1 through the electromagnetic valve PC5 to reduce the pressure in the wheel brake cylinder Wfr. When a pulse pressure increase mode is selected for the wheel brake cylinder Wfr, the electromagnetic valve PC5 is placed in its closed position and the electromagnetic valve PC1 is placed in its open position, so that the greater pressure of the master cylinder pressure and the pressure output from the pressure pump HP1 is supplied from the master cylinder MC to the wheel brake cylinder Wfr through the electromagnetic valve PC1 in its open position. Then, the electromagnetic valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the electromagnetic valve PC5 is placed in the closed position, and then the electromagnetic valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check position, and consequently to the low pressure reservoir LRS. Thus, an independent braking force control is performed with respect to each wheel.

The electromagnetic valves PC1, SC1, SI1 and the like, motor M, hydraulic pressure pumps HP1, HP2, reservoirs RS1, RS2, dampers DP1, DP2 and etc. to constitute the above hydraulic braking pressure control system are received in the housing H, or mounted thereon, to provide the hydraulic pressure control unit as shown in FIGS. 1–3. In the housing H, hydraulic passages including the auxiliary hydraulic passage MFc or the like are formed as shown in FIG. 3, and the electromagnetic valves PC1 and the like, which are connected to the hydraulic passages, are mounted on one wall of the housing H as shown in FIG. 1. Each electromagnetic valve has a valve mechanism accommodated in the housing H as shown in FIG. 2, which illustrates a sectional view of only the valve mechanism of the valve SI1, and a solenoid coil portion located on the one wall of the housing H. A case C is fixed to the housing H so as to surround the solenoid coil portions of all the electromagnetic valves. In FIG. 1, only the solenoid coil portions are shown, with the references designating the electromagnetic valves. In FIG. 3, hollow space is indicated by solid lines, and each space is designated by the reference designating a part (e.g., the electromagnetic valve) corresponding to the one received in that space.

With respect to the electromagnetic valves as shown in FIG. 1, each solenoid coil portion of the valves PC1–PC8 is formed into the same cylindrical configuration. Each solenoid coil portion of the valves SC1, SC2, SI1, SI2 has the same cylindrical configuration, with a larger outer diameter than that of each solenoid coil portion of the valves PC1–PC8. Accordingly, eight electromagnetic valves PC1–PC8 correspond to the small electromagnetic valves according to the present invention, while four electromagnetic valves SC1, SC2, SI1, SI2 correspond to the large electromagnetic valves according to the present invention.

According to a first embodiment as shown in FIG. 1, four electromagnetic valves PC1–PC4 for increasing the hydraulic pressure are aligned in a row, and four electromagnetic valves PC5–PC8 for decreasing the hydraulic pressure are aligned in a row, with two rows arranged in parallel with each other. With respect to the large electromagnetic valves SC1, SC2, SI1, SI2, two of them, e.g., the valves SC1, SC2 are aligned in a row, with one large electromagnetic valve (e.g., the valve SC1 in FIG. 1) located in substantial contact with two neighboring small electromagnetic valves (e.g., the valves PC1, PC2) at the outside thereof. And, the large electromagnetic valves SI1, SI2 are aligned in a row, with one large electromagnetic valve (e.g., the valve SI1 in FIG. 1) located in substantial contact with two neighboring small electromagnetic valves (e.g., the valves PC5, PC6) at the outside thereof.

Thus, two rows of the large electromagnetic valves SC1, SC2 and SI1, SI2 are located in parallel with each other on one wall of the housing H, and they are located in parallel with two rows of the small electromagnetic valves PC1–PC4 and PC5–PC6. As a result, the length of the housing H in the vertical direction in FIG. 1 can be shortened. At the same time, each of the electromagnetic valves SC1, SC2, SI1, SI2 is located in substantial contact with two neighboring small electromagnetic valves, so that the space defined between the two neighboring small electromagnetic valves can be used effectively to reduce the length of the housing H in the horizontal direction in FIG. 1. Furthermore, since the hydraulic pressure sensor PS is located between two large electromagnetic valves SC1, SC2, no other space is needed specifically to locate the sensor PS. As a result, the hydraulic pressure unit can be made without being enlarged.

According to the present embodiment, the electromagnetic valve SI1 (for introducing the fluid into the pump HP1) is located on an axis which is perpendicular to the axis of a passage P1 for communicating the reservoir RS1 with the inlet side of the pump HP1, and which is parallel with the axis of each electromagnetic valve (e.g., the valve PC1). As a result, it is unnecessary to provide an extending hydraulic passage formed along the axis of the pump HP1, by simply forming a passage P2 along the axis of the pump HP1 and in the same direction of the passage P1, and forming a passage P3 along the axis of the valve SI1. The passage P2 can be formed at the same time when the passage P1 is formed. Thus, the passage for communicating the electromagnetic valve SI1 with the inlet side of the pump HP1 can be formed easily.

Figure 5:
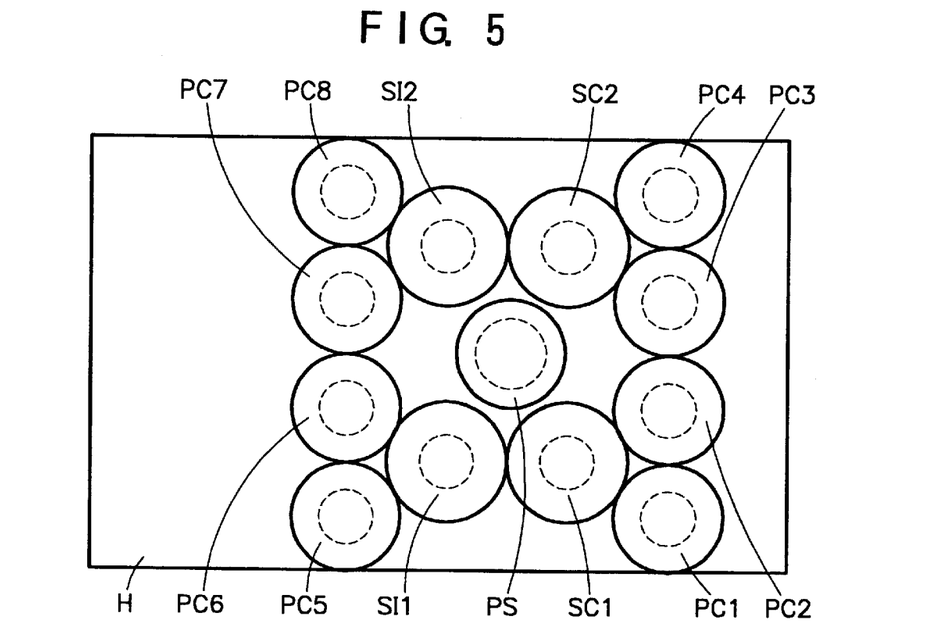
FIG. 5 is a plan view of a hydraulic pressure control unit with a case thereof removed, according to a second embodiment of the present invention.

FIG. 5 shows a second embodiment, in which four electromagnetic valves PC1–PC4 are aligned in a row, and four electromagnetic valves PC5–PC8 are aligned in a row, with two rows located in parallel with each other, to provide a space between them by a certain distance. Between these two rows of the small electromagnetic valves, the large electromagnetic valves SC1, SC2 and SI1, SI2 are located in parallel with them. That is, each of the large electromagnetic valve SC1, SC2, SI1 and SI2 is located in substantial contact with two neighboring small electromagnetic valves (e.g., the valves PC1, PC2 for the valve SC1) at the inside thereof. Therefore, in the central portion between the electromagnetic valves SC1, SC2 and SI1, SI2, is defined a space in which the hydraulic pressure sensor PS can be located, as shown in FIG. 5. As a result, the length of the housing H in the vertical direction in FIG. 5 can be shortened, and the length of the housing H in the horizontal direction in FIG. 5 can be shortened, as well. Furthermore, since the hydraulic pressure sensor PS is located on the space between the electromagnetic valves SC1, SC2, SI1, SI2, no other space is needed specifically to locate the sensor PS.

Figure 6:
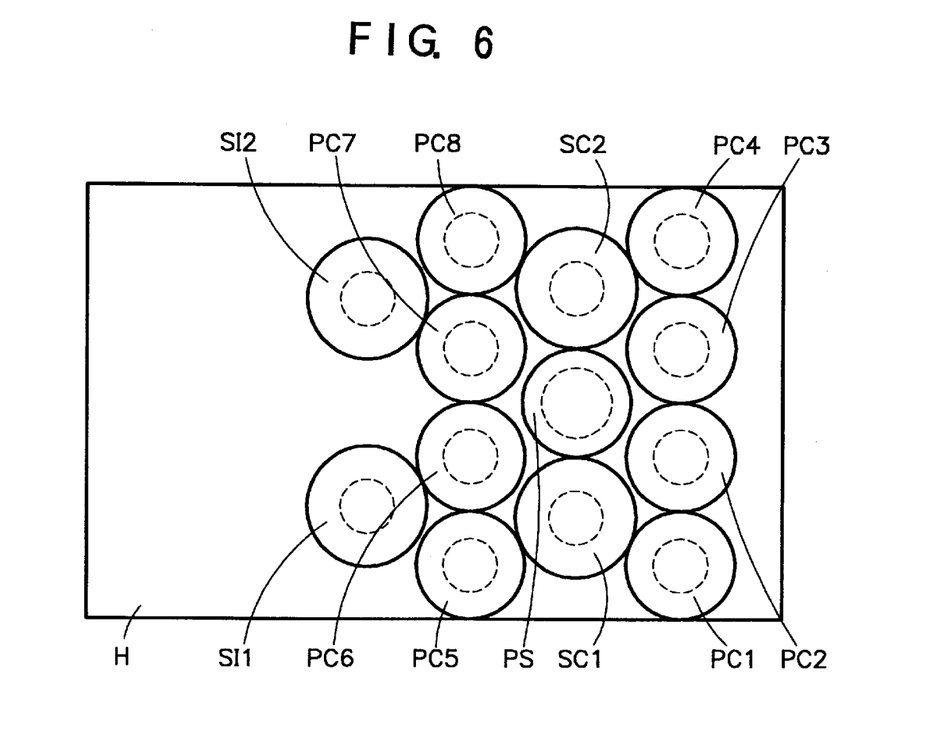
FIG. 6 is a plan view of a hydraulic pressure control unit with a case thereof removed, according to a third embodiment of the present invention.

FIG. 6 shows a third embodiment, in which four electromagnetic valves PC1–PC4 are aligned in a row, and four electromagnetic valves PC5–PC8 are aligned in a row. Between these two rows of the valves, the electromagnetic valves SC1, SC2 are located, while each of the electromagnetic valves SI1, SI2 is located in substantial contact with two neighboring small electromagnetic valves (out of the valves PC5–PC8) at the outside thereof. That is, one row of the small electromagnetic valves is located next to one row of the large electromagnetic valves, in such a manner that the electromagnetic valves PC1–PC4 are aligned in a row, then the electromagnetic valves SC1, SC2 are aligned in a row, then the electromagnetic valves PC5–PC8 are aligned in a row, and then the electromagnetic valves SI1, SI2 are aligned in a row, as shown in FIG. 6. Each of the large electromagnetic valve SC1, SC2, SI1 and SI2 is located in substantial contact with two neighboring small electromagnetic valves (e.g., the valves PC1, PC2 for the valve SC1). The hydraulic pressure sensor PS is located between the electromagnetic valves SC1 and SC2. As a result, the length of the housing H in the vertical direction in FIG. 6 can be shortened, and the length of the housing H in the horizontal direction in FIG. 6 can be shortened, as well. Furthermore, since the hydraulic pressure sensor PS can be located between the electromagnetic valves SC1 and SC2, no other space is needed specifically to locate the sensor PS.

According to each embodiment as described above, the space between the electromagnetic valves is used effectively, so that twelve electromagnetic valves having solenoid coil portions with different sizes can be located appropriately. As a result, the hydraulic pressure unit can be formed small in size, as a whole. The solenoid coil portions and the hydraulic pressure sensor PS can be installed easily at the outside of the housing H, to ensure a good productivity.

It should be apparent to one skilled in the art that the above-identified embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic pressure control unit comprising:
   a housing having hydraulic passages defined therein; and
   a plurality of electromagnetic valves having valve mechanisms disposed in said hydraulic passages and solenoid coil portions mounted on one wall of said housing for actuating said valve mechanisms, wherein said electromagnetic valves include;
   four large electromagnetic valves provided with cylindrical solenoid coil portions, each having a relatively large diameter, and
   eight small electromagnetic valves provided with cylindrical solenoid coil portions, each having a relatively small diameter, and wherein two rows of four small electromagnetic valves aligned in a row are located in parallel with each other on the wall of said housing, and two rows of two large electromagnetic valves aligned in a row are located in parallel with the two rows of said four small electromagnetic valves.

2. A hydraulic pressure control unit of claim 1, further comprising:
   a hydraulic pressure sensor for detecting the hydraulic pressure in the hydraulic passages defined in said housing, said hydraulic pressure sensor being located between said two large electromagnetic valves aligned in a row.

3. A hydraulic pressure control unit of claim 1, wherein each of said four large electromagnetic valves is located in substantial contact with two neighboring small electromagnetic valves in each row of said four small electromagnetic valves.

4. A hydraulic pressure control unit of claim 3, wherein the two rows of said four small electromagnetic valves are located between the two rows of said two large electromagnetic valves, with each of said four large electromagnetic valves located in substantial contact with two neighboring small electromagnetic valves at the outside thereof, respectively.

5. A hydraulic pressure control unit of claim 4, further comprising:
   hydraulic pressure sensor for detecting the hydraulic pressure in the hydraulic passages defined in said housing, said hydraulic pressure sensor being located between said two large electromagnetic valves aligned in a row.

6. A hydraulic pressure control unit of claim 3, wherein the two rows of said two large electromagnetic valves are located between the two rows of said four small electromagnetic valves, with each of said four large electromagnetic valves located in substantial contact with two neighboring small electromagnetic valves at the inside thereof, respectively.

7. A hydraulic pressure control unit of claim 6, further comprising:

a hydraulic pressure sensor for detecting the hydraulic pressure in the hydraulic passages defined in said housing, said hydraulic pressure sensor being located to be surrounded by said four large electromagnetic valves.

8. A hydraulic pressure control unit of claim 3, wherein each row of said two large electromagnetic valves is located next to each row of said four small electromagnetic valves, with each of said four large electromagnetic valves located in substantial contact with two neighboring small electromagnetic valves at the inside thereof, respectively.

9. A hydraulic pressure control unit of claim 8, further comprising:

a hydraulic pressure sensor for detecting the hydraulic pressure in the hydraulic passages defined in said housing, said hydraulic pressure sensor being located between said two large electromagnetic valves aligned in a row.

10. A hydraulic pressure control unit of claim 1, further comprising:

a reservoir formed in said housing for storing brake fluid; and     a hydraulic pressure pump installed in said housing and communicated at an inlet side of said pump with said reservoir through a passage defined in said housing, said pump introducing the brake fluid from said reservoir and pressurizing the brake fluid to output the hydraulic pressure,     wherein one of said electromagnetic valves is located on an axis perpendicular to the axis of said passage for communicating said reservoir with the inlet side of said pump, and parallel with the axis of each of said electromagnetic valves.

* * * * *